US005095698A

United States Patent [19]

Deininger

[11] Patent Number: 5,095,698

[45] Date of Patent: Mar. 17, 1992

[54] HYDROSTATIC TRANSMISSION

[75] Inventor: Horst Deininger, Hoerstein/Alzenau, Fed. Rep. of Germany

[73] Assignee: Linde Aktiengesellschaft, Fed. Rep. of Germany

[21] Appl. No.: 559,300

[22] Filed: Jul. 30, 1990

[30] Foreign Application Priority Data

Jul. 31, 1989 [DE] Fed. Rep. of Germany ....... 3925298

[51] Int. Cl.[5] ............................................ F16D 31/02

[52] U.S. Cl. ........................................ 60/452; 60/487

[58] Field of Search ................. 60/443, 445, 452, 487, 60/490; 91/497, 504-506; 417/218

[56] References Cited

U.S. PATENT DOCUMENTS

| | | | |
|---|---|---|---|
| 3,591,965 | 7/1971 | Bobst et al. | 60/487 |
| 3,823,558 | 7/1974 | Tittmann et al. | 60/451 |
| 3,846,982 | 11/1974 | Rometsch et al. | 60/445 |
| 4,341,133 | 7/1982 | Sakamoto | 60/490 |
| 4,498,847 | 2/1985 | Akiyama | 417/218 |
| 4,932,208 | 6/1990 | Koyama et al. | 60/487 |

FOREIGN PATENT DOCUMENTS 2231421 1/1974 Fed. Rep. of Germany .

*Primary Examiner*—Edward K. Look
*Assistant Examiner*—F. Daniel Lopez
*Attorney, Agent, or Firm*—Webb, Burden, Ziesenheim & Webb

[57] ABSTRACT

A hydrostatic transmission in a closed circuit which includes a hydraulic engine having a stroke-volume control device and a hydraulic pump connected to said hydraulic engine by two pressure lines. The stroke volume of the pump and/or the engine is regulated by the stroke-volume control device. The closed circuit includes a reversing valve which is connected to both pressure lines and is controlled by the prevailing pressures in the pressure lines. The reversing valve connects the pressure line carrying the lower pressure to a delivery valve and connects the pressure line carrying the higher pressure to a pressure-reducing valve so that the level of the control pressure in the stroke-volume control device is determined. A pressure-reducing valve is located in each pressure line and the pressure-reducing valves and the reversing valve are combined as a single combination valve.

18 Claims, 3 Drawing Sheets

HYDROSTATIC TRANSMISSION

BACKGROUND OF THE INVENTION

1. Field of the Invention

The invention relates generally to a hydrostatic transmission in a closed circuit with a hydraulic engine that is connected to a hydraulic pump. The stroke volume of at least the pump or the motor, and preferably the pump and the motor are regulated by feed pressure, and a flushing system is provided that includes a reversing valve connected to two pressure lines and controlled by the pressure prevailing in the lines. The reversing valve is connected to a delivery valve by the low-pressure line.

2. Description of Related Prior Art

This type of hydrostatic transmission is described in U.S. Pat. No. 3,846,982 wherein the stroke volume of the hydraulic pump is regulated by high pressure which is a disadvantage in a transmission of this type because high-pressure adjustment requires the absorption of large forces at the limit stops in the stroke-volume control. In addition, the large-pressure differential between the minimum high pressure and the maximum high pressure causes uneven control forces and control times. Another disadvantage of this type of hydrostatic transmission is that when two such hydrostatic transmissions are required, as in the case of crawler drives, different pressures may be produced by different tractional resistances on the opposite sides of the vehicle. This difference causes the stroke-volume controls of the hydraulic engines to be supplied with different control pressures which causes the stroke volumes and the driving speeds to differ on each side of the vehicle which results in deviations from the desired direction of travel unless constantly adjusted.

To avoid the above-noted problems, it is known to provide a low-pressure control instead of a high-pressure control. However, a low-pressure control requires a separate feed pump which increases the cost of the vehicle. In addition, low-pressure control has the disadvantage that large regulating pistons are necessary to produce a sufficient control force and the machine must be large.

The present invention avoids the above-mentioned disadvantages and provides a simple and economic hydrostatic transmission. The stroke-volume adjustment of at least one of the hydraulic machines is determined by the delivery pressure which is lower than the pressure in the high-pressure line.

SUMMARY OF THE INVENTION

The problems are solved according to the present invention in that the pressure line that carries the high pressure is connected to a pressure-reducing valve which is connected to a reversing valve. The pressure-reducing valve determines the level of the control pressure which prevails in the stroke-volume control of at least one hydraulic machine. The connection between the reversing valve and the pressure-reducing valve is such that a specific amount of control oil is removed from the high-pressure line only so that the pressure of the control oil is limited to an adjustable value. Instead of being strictly a high-pressure, stroke-volume control the invention provides a stroke-volume control with a relatively low control pressure which is still higher than the commonly used low-pressure level.

The invention is also advantageous when a pressure-reducing valve is provided for each pressure line and the reversing valve and the pressure-reducing valve are combined in a single valve. In that case, the pressure-reducing valve connected to low pressure allows an unobstructed stream of oil to flow from the low-pressure line to the delivery valve. Additionally, the combination of the pressure-reducing valve and the reversing valve results in a compact design.

The combination valve is formed as a valve piston moving longitudinally between two end positions. The pressure in one pressure line is applied to the closed ends of the valve piston and the valve has an axial cavity which is connected by annular grooves and radial bores with channels formed in the valve housing. The valve includes two longitudinally, movable pressure-reducing pistons that at least partially cover radial bores in the axial cavity as a function of their axial position. The combination valve functions accurately with the annular grooves and radial bores of the valve piston connecting, by means of the valve's interior axial cavity, with specific channels on the housing side depending upon the axial position of the valve piston relative to the housing. The pressure-reducing pistons move longitudinally within the axial cavity to partially cover radial bores in the valve piston and, depending upon their position, restrict the amount of flow to create a pressure-reducing effect.

In order to control the position of the pressure-reducing pistons the ends of the pressure-reducing pistons that face the closed ends of the valve piston are spring-loaded and the opposite ends of the pistons are provided with an axial bore communicating with radial bores which can be at least partially closed. At least one radial bore in the valve piston is connected to one of the pressure lines so that the pressure in one pressure line is always applied to the end of the pressure-reducing piston opposite the spring-loaded end. If the pressure line is the high-pressure line, the pressure-reducing piston is displaced against the spring tension and, by partially covering the feed channels, the oil supplied to the end of the piston is reduced to a degree which consequently reduces the pressure on the piston. When the valve piston is in a stop position one of its radial bores establishes a connection between a housing control-pressure channel and the space ahead of the pressurized end of the pressure-reducing piston. In contrast, the low-pressure line is connected with a housing channel that leads to a delivery valve by the axial bore in the front of the second pressure-reducing piston and its radial bores by a radial bore in the valve piston.

Instead of the two pressure-reducing pistons being spring-loaded, a second embodiment of the invention provides that the end of each pressure-reducing piston that faces a closed end of the cavity is acted upon by a high-pressure piston that moves longitudinally in a continuous axial bore through the end closure of the valve piston. The opposite end of each pressure-reducing piston has an axial bore connected with radial bores that can be at least partially connected with radial bores in the valve piston. At least one radial bore of the valve piston is connected to a pressure line. In this embodiment the spring tension acting upon the pressure-reducing valve on the high-pressure side is replaced by the force of the high-pressure fluid acting on the relatively small area of the end of the high-pressure piston. This arrangement results in the control pressure having a certain relationship to the high pressure which relationship corresponds to the area ratios of the end of the high-pressure piston to the end of the pressure-reducing piston, which increases the control force proportionately to the load. In this arrangement, the high-pressure piston on the low-pressure end functions as a stop for the pressure-reducing valve on the low-pressure end.

Another advantage of the invention is that the combination valve and the delivery valve are located within the control-base housing of a variable displacement hydraulic engine whose setting is dependent upon a control pressure produced in the combination valve. This results in a compact design which can be easily retrofitted to either conventional low-pressure or conventional high-pressure adjustment because of exchangeable control-base housings. The combination valve in the control-base housing can be easily flushed and the oil circulating in the hydrostatic transmission can be passed to a cooling device to remove the heat generated in the transmission from the engine casing.

In hydrostatic transmissions having a feed pump connected to a pressure line by a check valve, it is advantageous if the control pressure can be regulated to a value between the feed pressure produced by the feed pump and the maximum high pressure. The result is that the advantages of low-pressure regulation such as uniform forces acting upon the stroke-volume control device and good control of the control ends are combined with the advantages of high-pressure regulation such as adequate power level and pistons with moderate control diameters.

The features which characterize the invention are pointed out with particularity in the claims annexed hereto and forming a part of this application. For a complete understanding of the invention, its operating advantages and the specific objects attained by its use, reference should be had to the accompanying drawings and descriptive matter in which preferred embodiments of the invention are illustrated and described. Like reference characters describe like parts throughout the drawings.

DESCRIPTION OF THE PREFERRED EMBODIMENTS

Figure 1:
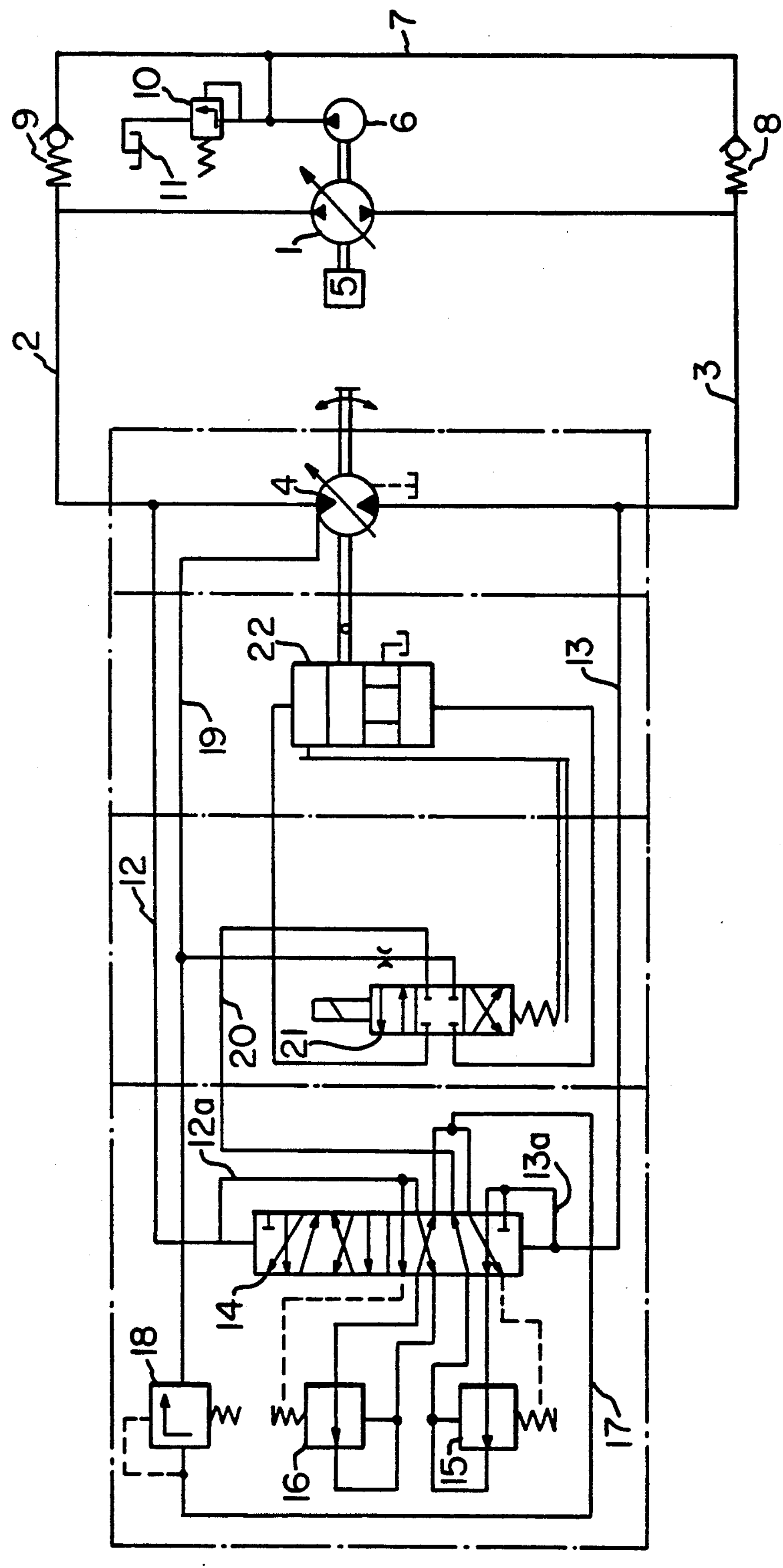
FIG. 1 is a circuit diagram of a hydrostatic transmission according to the invention.

A hydrostatic transmission is located in a closed circuit including a variable displacement hydraulic pump 1 and a variable displacement hydraulic engine 4 connected to pump 1 by pressure lines 2 and 3. A drive motor 5 which is in rotational synchronization with hydraulic pump 1 drives a feed pump 6 which is connected to pressure lines 2 and 3 by a line 7 having check valves 8 and 9 located therein. The pressure of feed pump 6 is monitored by a pressure-relief valve 10 and excess oil is discharged into a tank 11.

Pressure line 2 is connected by a line 12 and pressure line 3 is connected by a line 13 to the opposite ends of a two-position reversing valve 14. Lines **12*a* and 13*a* branch off, respectively, from lines 12 and 13 and lead to different flow pairs depending upon the control position of reversing valve 14. Pressure-reducing valves 15 and 16 are connected to reversing valve 14 and are connected by a line 17 to a delivery valve 18. The outlet line 19 from delivery valve 18 is connected to hydraulic engine 4. The reversing valve 14 is also connected to an electromagnetically controlled relay valve 21 which is connected to stroke-volume control 22 of hydraulic engine 4**.

When reversing valve 14 is in the position shown in FIG. 1 of the drawings, pressure line 3 is the high-pressure line through which oil under high pressure is delivered from hydraulic pump 1 to hydraulic engine 4. The high pressure is transmitted by line 13 to the lower end of reversing valve 14 and causes the valve to move upwardly as shown in FIG. 1 of the drawings. Consequently, a connection is established between a high-pressure branch line **13*a* and a pressure-reducing valve 15 which reduces the high pressure to a control pressure which is then passed to the stroke-volume control 22 through reversing valve 14, line 20 and relay valve 21. In the switching position shown in FIG. 1 of the drawings for reversing valve 14, branch line 12*a* which is under low pressure is connected to the outlet end of pressure-reducing valve 16 and the intake end of valve 16 is connected to delivery valve 18 through reversing valve 14 and line 17. In this direction of flow and with the application of low pressure, pressure-reducing valve 16** offers substantially no resistance to the flow therethrough.

Figure 2:
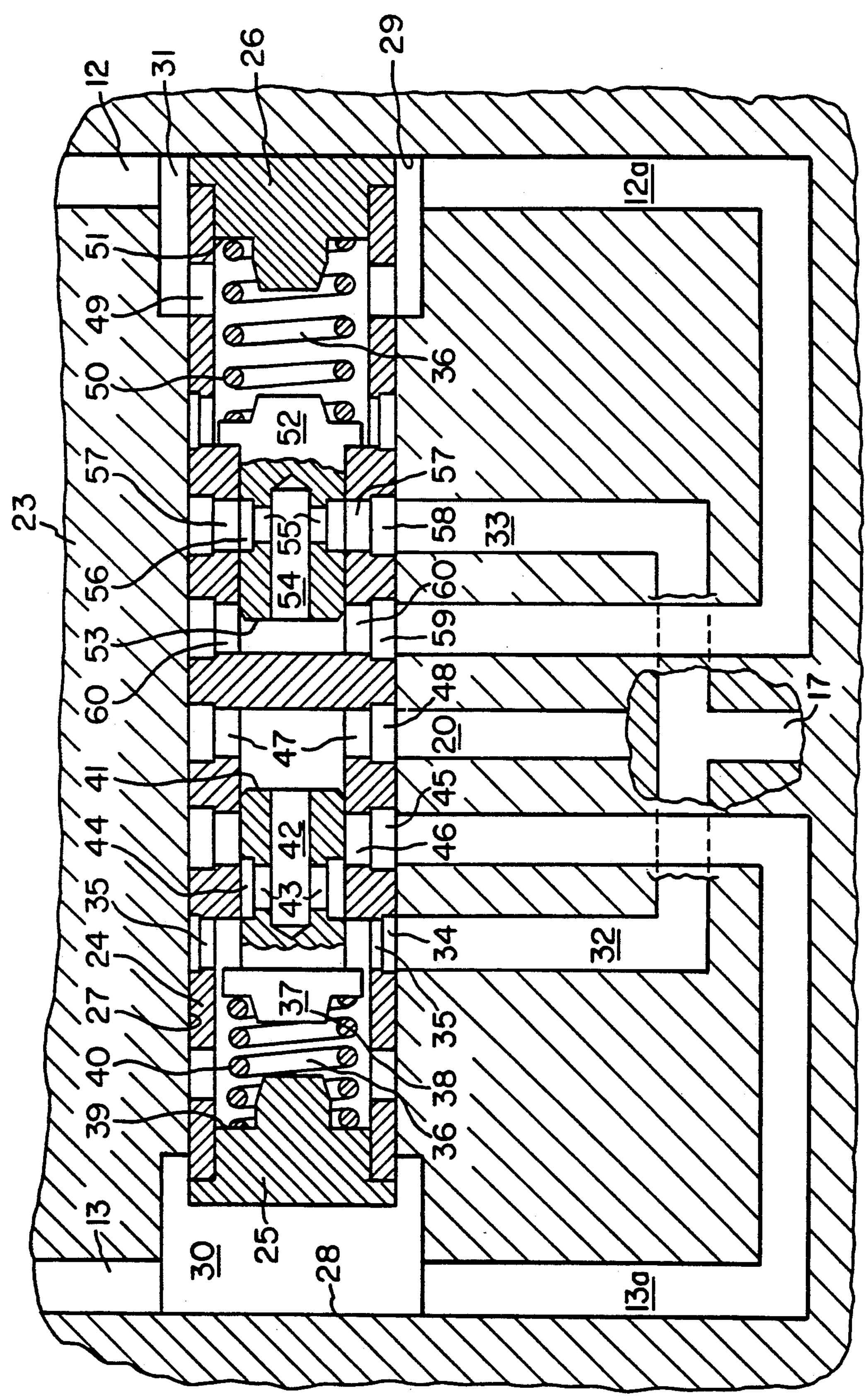
FIG. 2 is a schematic sectional view of one embodiment of a combination valve.

FIG. 2 of the drawings shows one embodiment of a combination pressure-reducing valve and reversing valve which is located in control-base housing 23 of hydraulic engine 4. The combination valve includes a cylindrical, longitudinally moveable valve piston 24 comprised of an elongated sleeve closed by end members 25 and 26. Valve piston 24 moves longitudinally in a cylindrical bore 27 between spaced limit stops 28 and 29. The diameter of the ends of cylindrical bore 27 is increased in the area of limit stops 28 and 29 to form chambers 30 and 31. Chamber 30 is connected to pressure line 13 and chamber 31 is connected to pressure line 12. Depending upon which pressure line 12 or 13 carries the higher pressure, valve piston 24 is moved to the left or to the right by the force of the oil acting upon end members 25 and 26 of the valve piston. As shown in FIG. 2 of the drawings, pressure line 13 is the higher pressure line and valve piston 24 has been moved to the right until end member 26 rests against limit stop 29. Therefore, the left end of valve piston 24 is the high-pressure end and the right end of the valve piston is the low-pressure end.

Two channels 32 and 33 formed in control-base housing 23 are connected to a line 17 and open radially into cylindrical bore 27 to connect the cylindrical bore with delivery valve 18. A line **13*a* connects chamber 30 to cylindrical bore 27 and a line 12*a* connects chamber 31 to cylindrical bore 27. The openings of channels 32 and 33 and of lines 13*a* and 12*a* into cylindrical bore 27 are spaced along the length of the bore. A line 20 also opens into cylindrical bore 27 and leads to relay valve 21** which receives oil under control pressure.

Valve piston 24 has a series of annular grooves connecting with radial bores. In the valve piston shown in FIG. 2 of the drawings, an annular groove 34 and radial bores 35 are in flow communication with channel 32. The radial bores 35 end in a cavity 36 within valve piston 24 which is closed by end member 25 and contains an axial pressure-reducing piston 37. Pressure-reducing piston 37 moves longitudinally within a reduced-diameter portion of cavity 36 and is forced to the right in FIG. 2 of the drawings by a coil spring 40 located between the left front end 38 of pressure-reducing piston 37 and the inside surface 39 of valve piston end member 25. Pressure-reducing piston 37 has a blind axial bore 42 extending from its end 41 and communicating with radial bores 43. The radial bores 43 open into an annular groove 44 formed in pressure-reducing piston 37 and are initially in flow communication with high-pressure line 13*a* due to the position of pressure-reducing piston 37 as determined by the tension of spring 40.

In the initial position of pressure-reducing piston 37 oil under pressure passes through line 13*a*, annular groove 45 in valve piston 24 and radial bores 46 to annular groove 44 and radial bores 43 in pressure-reducing piston 37. The oil flows from bores 43 through axial bore 42 to the end 41 of piston 37 and applies a force to the piston which is opposite to the force of spring 40. This force tends to move piston 37 to the left as shown in FIG. 2 of the drawings and causes the oil supply to be restricted at the transition between radial bores 46 in valve piston 24 and annular groove 44 in pressure-reducing piston 37. The oil which passes through pressure-reducing piston 37 is under a reduced pressure and is passed by radial bores 47 and annular groove 48 to line 20 which carries the oil to relay valve 21.

On the low-pressure end of the combination valve, oil flows to chamber 31 through pressure line 12 and passes through radial bores 49 in valve piston 24 into axial cavity 36 in valve piston 24. The axial cavity contains a coil spring 50 located between the inside surface 51 of end member 26 of valve piston 24 and the end of a pressure-reducing piston 52. Pressure-reducing piston 52 is forced to its left as shown in FIG. 2 of the drawings by spring 50.

A blind axial bore 54 extends from the end 53 of pressure-reducing piston 52 that is opposite the end in contact with coil spring 50. The bore 54 is connected to radial bores 55 in pressure-reducing piston 52 which connect with an annular groove 56 formed in pressure-reducing piston 52. In the position shown in FIG. 2 of the drawings annular groove 56 is in flow communication with radial bores 57 which open into an annular groove 58 in valve piston 24. The annular groove 58 is in flow communication with channel 33 formed in control-base housing 23 which is connected to delivery valve 18 by line 17. An annular groove 59 in valve piston 24 and radial bores 60 lead to a cavity adjacent the end 53 of pressure-reducing piston 52. Groove 59 is in communication with line 12*a* which is connected to chamber 31 and carries oil under low pressure. Thus, the oil flows through axial bore 54, radial bores 55 and annular groove 56 in pressure-reducing piston 52 to radial bores 57 and the annular groove 58 in valve piston 24 to channel 33 and line 17 to delivery valve 18.

Under reverse pressure conditions, namely when line 12 carries high pressure and line 13 carries low pressure, valve piston 24 is moved to the left and the positions of pressure-reducing pistons 37 and 52 are accordingly reversed.

Figure 3:
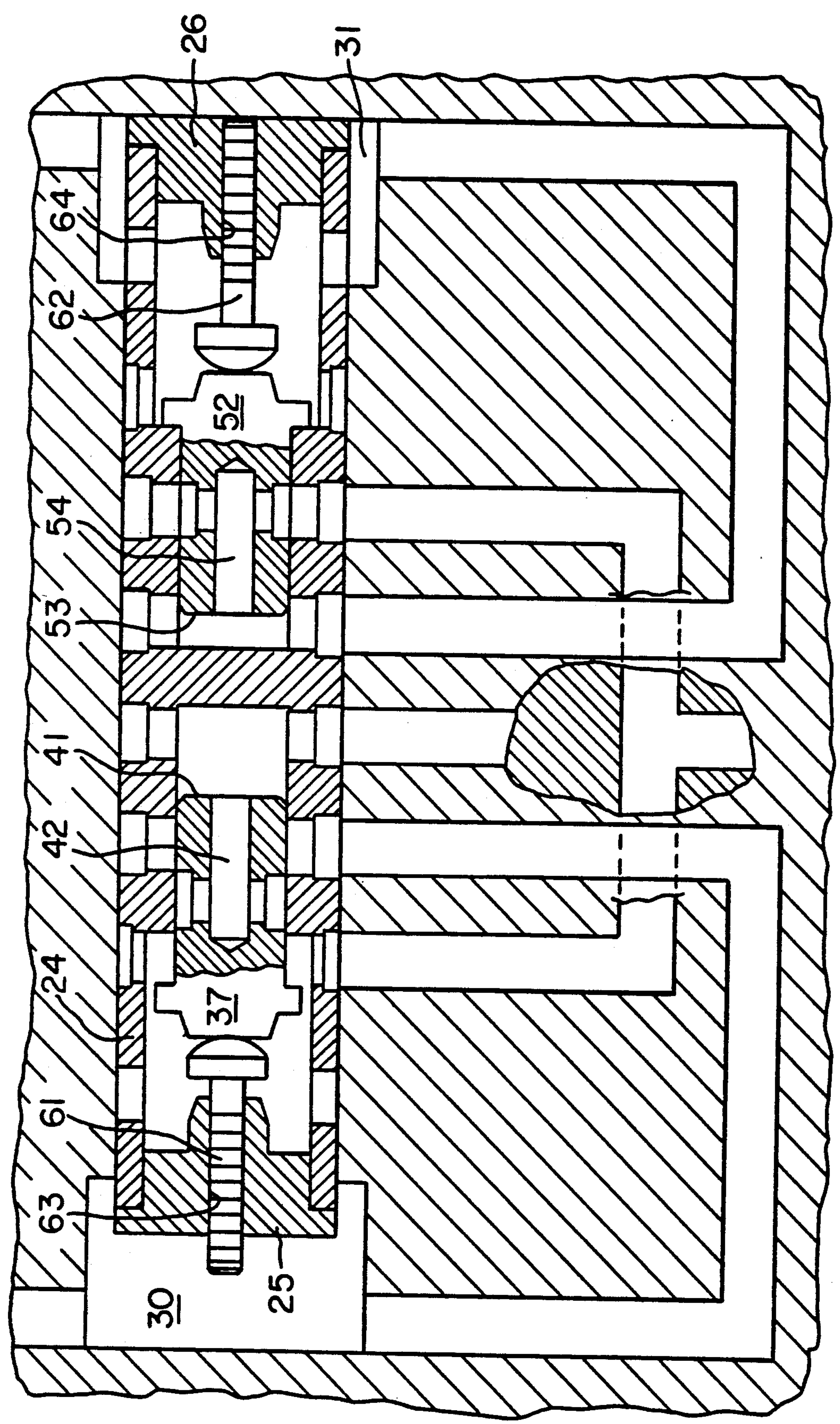
FIG. 3 is a schematic sectional view of a second embodiment of a combination valve.

The embodiment shown in FIG. 3 of the drawings differs from the embodiment shown in FIG. 2 in that high-pressure pistons 61 and 62 are employed in place of coil springs 40 and 50. The high-pressure pistons 61 and 62 move longitudinally in bores 63 and 64 in the end members 25 and 26 of valve piston 24. The high pressure in chamber 30 communicates with the end of high-pressure piston 61 and forces pressure-reducing piston 37 to the right as shown in FIG. 3 of the drawings. In the opposite direction the control pressure is effective in a certain relationship to the high pressure corresponding to the area ratio of the end of high-pressure piston 61 to the front end 41 of pressure-reducing piston 37. The high-pressure piston 62 on the low-pressure end of the combination valve functions as a stop for pressure-reducing piston 52 and forces piston 62 into a position similar to that caused by coil spring 50 in FIG. 2.

The foregoing describes preferred embodiments of the invention and is given by way of example only. The invention is not limited to any of the specific features described herein, but includes all variations thereof within the scope of the appended claims.

I claim:

1. A hydrostatic transmission in a closed circuit including a hydraulic engine having a stroke-volume control device and a hydraulic pump connected to said hydraulic engine by two pressure lines wherein the stroke volume of at least the pump or the engine, can be regulated, said closed circuit also including a circulatory flushing system having a reversing valve connected to said two pressure lines and controlled by the prevailing pressures in said two pressure lines, said reversing valve connecting said pressure line carrying low pressure to a delivery valve and connecting said pressure line carrying high pressure to a pressure-reducing valve whereby the level of control pressure in said stroke-volume control device for said hydraulic engine is determined.

2. A hydrostatic transmission as set forth in claim 1, including a valve connected to each of said two pressure lines, wherein said valve connected to one of said pressure lines carrying high pressure acts as said pressure-reducing valve and wherein said valves and said reversing valve are combined in a single combination valve.

3. A hydrostatic transmission according to claim 2, wherein said combination valve includes a housing and a hollow cylindrical valve piston having a closed end member at each end, said valve piston adapted to move longitudinally in said housing between two end positions whereby pressure from one of said pressure lines is applied to one of said closed end members of said valve piston, said valve piston having axial cavities, said valve piston having means interconnecting said cavities in said valve piston with different channels formed in said housing depending upon the axial position of said valve piston in said housing, and said valve piston having two longitudinal axially moving pressure-reducing pistons located therein that cover, at least partially, said means interconnecting said cavities with said channels in said valve piston depending on their axial position.

4. A hydrostatic transmission as set forth in claim 3, wherein said means in said valve piston is a plurality of radial bores and annular grooves formed in said valve piston.

5. A hydrostatic transmission according to claim 4, wherein said hydraulic engine has a control-base housing and said combination valve and said delivery valve are located in said control-base housing whereby the setting of said hydraulic engine is determined by a control pressure produced by said combination valve.

6. A hydrostatic transmission according to claim 4 having a feed pump connected to each of said two pressure lines by a check valve in each of said two pressure lines wherein the control pressure can be adjusted to a value between the supply pressure produced by said feed pump and the maximum possible high pressure.

7. A hydrostatic transmission according to claim 3, wherein each of said pressure-reducing pistons has a first end facing a closed end member of said valve piston and a second end, a coil spring located in each of said cavities between said first end and said closing end member, said second end of each of said pressure-reducing pistons having a blind axial bore extending therethrough and a plurality of radial bores in each of said pressure-reducing pistons opening into the closed end of each of said blind axial bores, said radial bores adapted to be, at least partially, in flow communication with said radial bores in said valve piston, and at least one of said radial bores in said valve piston adapted to be in flow communication with one of said pressure lines.

8. A hydrostatic transmission according to claim 7, wherein said hydraulic engine has a control-base housing and said combination valve and said delivery valve are located in said control-base housing whereby the setting of said hydraulic engine is determined by a control pressure produced by said combination valve.

9. A hydrostatic transmission according to claim 7 having a feed pump connected to each of said two pressure lines by a check valve in each of said two pressure lines wherein the control pressure can be adjusted to a value between the supply pressure produced by said feed pump and the maximum possible high pressure.

10. A hydrostatic transmission according to claim 3, wherein each of said pressure-reducing pistons has a first end facing a closed end member of said valve piston and a second end, a continuous axial bore in a valve piston closed end member and a high-pressure piston located in each of said axial bores a blind axial bore extending through the second end of each of said pressure-reducing pistons, and a plurality of radial bores in each of said pressure-reducing piston opening into said blind axial bore, said radial bores adapted to be, at least partially, in flow communication with said radial bores in said valve piston, and at least one of said radial bores in said valve piston being in flow communication with one of said pressure lines.

11. A hydrostatic transmission according to claim 10, wherein said hydraulic engine has a control-base housing and said combination valve and said delivery valve are located in said control-base housing whereby the setting of said hydraulic engine is determined by a control pressure produced by said combination valve.

12. A hydrostatic transmission according to claim 10 having a feed pump connected to each of said two pressure lines by a check valve in each of said two pressure lines wherein the control pressure can be adjusted to a value between the supply pressure produced by said feed pump and the maximum possible high pressure.

13. A hydrostatic transmission according to claim 3, wherein said hydraulic engine has a control-base housing and said combination valve and said delivery valve are located in said control-base housing whereby the setting of said hydraulic engine is determined by a control pressure produced by said combination valve.

14. A hydrostatic transmission according to claim 3 having a feed pump connected to each of said two pressure lines by a check valve in each of said two pressure lines wherein the control pressure can be adjusted to a value between the supply pressure produced by said feed pump and the maximum possible high pressure.

15. A hydrostatic transmission according to claim 2, wherein said hydraulic engine has a control-base housing and said combination valve and said delivery valve are located in said control-base housing whereby the setting of said hydraulic engine is determined by a control pressure produced by said combination valve.

16. A hydrostatic transmission according to claim 15 having a feed pump connected to each of said two pressure lines by a check valve in each of said two pressure lines wherein the control pressure can be adjusted to a value between the supply pressure produced by said feed pump and the maximum possible high pressure.

17. A hydrostatic transmission according to claim 2 having a feed pump connected to each of said two pressure lines by a check valve in each of said two pressure lines wherein the control pressure can be adjusted to a value between the supply pressure produced by said feed pump and the maximum possible high pressure.

18. A hydrostatic transmission according to claim 1 having a feed pump connected to each of said two pressure lines by a check valve in each of said two pressure lines wherein the control pressure can be adjusted to a value between the supply pressure produced by said feed pump and the maximum possible high pressure.

* * * * *